United States Patent [19]
Hayashi et al.

[11] Patent Number: 5,788,923
[45] Date of Patent: Aug. 4, 1998

[54] BEARING STEEL

[75] Inventors: Ryoji Hayashi; Kaneaki Hamada, both of Hyogo-ken; Yasuo Murakami, Kanagawa-ken, all of Japan

[73] Assignees: Sanyo Special Steel Co., Ltd., Hyogo-ken; NSK Ltd., Tokyo-to, both of Japan

[21] Appl. No.: 718,819

[22] Filed: Nov. 1, 1996

[30] Foreign Application Priority Data

Nov. 1, 1995 [JP] Japan ................... 7-284719

[51] Int. Cl.⁶ .................. C22C 38/06; C22C 38/26
[52] U.S. Cl. .................. 420/104; 420/110; 148/333; 148/906
[58] Field of Search ................... 420/104, 110; 148/906, 333

[56] References Cited

U.S. PATENT DOCUMENTS 4,889,567 12/1989 Fujiwara et al. .
4,904,094 2/1990 Furumura et al. .

FOREIGN PATENT DOCUMENTS

| | | |
|---|---|---|
| 0301228 | 2/1989 | European Pat. Off. . |
| 3335224 | 5/1985 | Germany . |
| 46-30931 | 9/1971 | Japan ................... 420/110 |
| 720047 | 9/1980 | U.S.S.R. ................... 148/333 |
| 0389984 | 3/1933 | United Kingdom . |
| 1408218 | 10/1975 | United Kingdom . |
| 2155951 | 10/1985 | United Kingdom . |
| 2161831 | 1/1986 | United Kingdom . |
| 2164057 | 3/1986 | United Kingdom . |

*Primary Examiner*—Deborah Yee
*Attorney, Agent, or Firm*—Birch, Stewart, Kolasch & Birch, LLP

[57] ABSTRACT

A bearing steel is provided which can satisfy bearing property requirements and, at the same time, is improved in mechanical properties, such as impact, crushing, and transverse properties, while reducing the cost of materials and the cost of heat treatment for the production of a bearing. The bearing steel comprises by weight C: 0.70 to 0.93%, Si: 0.15 to 0.50%, Mn: 0.50 to 1.10%, Cr: 0.30 to 0.65%, and N: 0.005 to 0.02% with the balance consisting of Fe and unavoidable impurities and $0.4 \leq Cr/C \leq 0.7$, the steel further comprising at least one of (1) Al: 0.01 to 0.1% with $Al \times N \geq 0.00015$ and (2) Nb: 0.02 to 0.1%. A rolling bearing produced from the bearing steel is also provided.

20 Claims, 2 Drawing Sheets

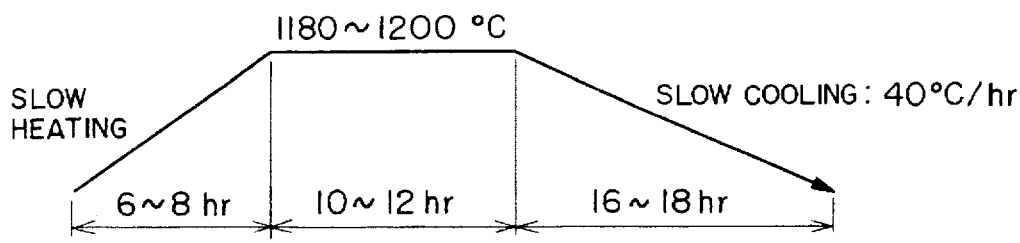
F I G. 1
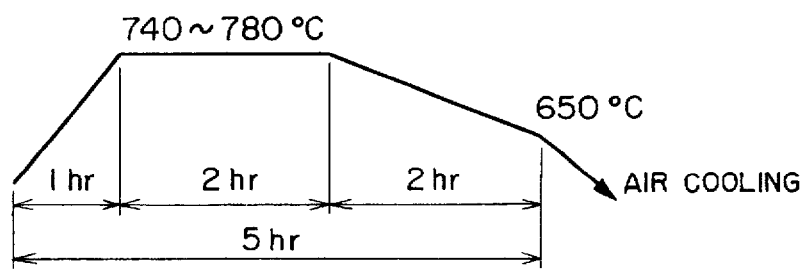
F I G. 2 (a)
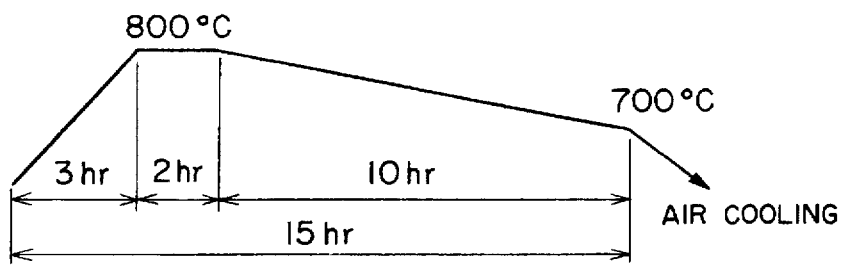
F I G. 2 (b)
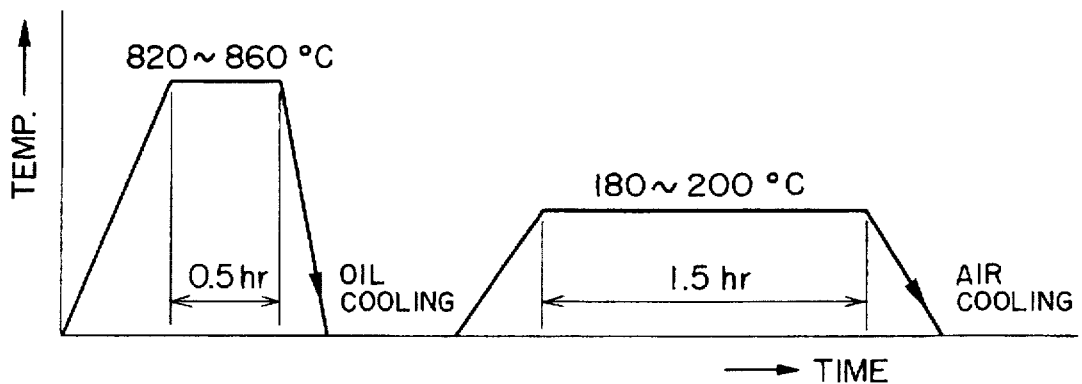
F I G. 3 ns, also inhib
BEARING STEEL

TECHNICAL FIELD

The present invention relates to a bearing steel improved in mechanical properties by virtue of prevention of the creation of giant carbides at the time of pouring of a steel ingot and the refinement of grains after quench-and-temper treatment, and a rolling bearing produced from said bearing steel.

BACKGROUND OF THE INVENTION

Through hardening type bearing steels, such as SUJ2 and SUJ3, and case hardening type steels, such as SCr420 and SCM420, have hitherto been used as materials for rolling elements and inner and outer rings which are components of rolling bearings.

For high carbon chromium steels, such as SUJ2 and SUJ3, soaking treatment at a high temperature for a long period of time as shown in FIG. 1 is necessary in order to eliminate giant carbides created at the time of pouring of a steel ingot, increasing the production cost.

In the case of case hardening steels, the carbon concentration of the material is so low that heat treatment, for a long period of time, such as carburizing or carbo-nitriding, is necessary in order to harden the skin layer, resulting in increased heat treatment cost.

The present invention has been made with a view to solving the above problems, and an object of the present invention is to provide a bearing steel which can reduce the material cost and the cost of heat treatment in the production of the bearing and, at the same time, can satisfy bearing property requirements and, in addition, is improved in mechanical properties, such as impact property, crushing property, and transverse property, a rolling bearing produced from said steel.

SUMMARY OF THE INVENTION

The present inventors have made a large number of research and development on optimal material and heat treatment while taking the cost into consideration.

As a result, they have found the following technical matters.

(1) In the case of a high carbon chromium steel, the limitation of C and Cr contents and Cr/C ratio can prevent the creation of giant carbides at the time of pouring, enabling the step of soaking at a high temperature for a long period of time to be eliminated.

(2) Spheroidizing before cutting requires shorter treatment time and lower treatment temperature than those required in the prior art.

(3) In a high C region, not only impact properties but also crushing properties and transverse properties are proportional to the minus one-half power of the grain diameter.

(4) Refinement of grains is very effective in improving mechanical properties such as impact properties, crushing properties, and transverse properties.

(5) In a high C region, fine carbides dispersed in the matrix inhibit coarsening of grains.

(6) Precipitates, such as AlN and Nb(C,N), also inhibits coarsening of grains.

(7) Utilization of AlN and Nb(C,N) can improve mechanical properties of a bearing steel, such as impact, crushing, and transverse properties.

The present inventors have been made base on the above finding.

According to one aspect of the present invention, there is provided a bearing steel comprising by weight C: 0.70 to 0.93%, Si: 0.15 to 0.50%, Mn: 0.50 to 1.10%, Cr: 0.30 to 0.65%, and N: 0.005 to 0.02% with $0.4 \leq Cr/C \leq 0.7$ and the balance consisting of Fe and unavoidable impurities, said steel further comprising at least one of (1) Al: 0.01 to 0.1% with $Al \times N \geq 0.00015$, and (2) Nb: 0.02 to 0.1%.

According to another aspect of the present invention, there is provided a rolling bearing comprising an inner ring, an outer ring, and a plurality of rolling elements rolled between the inner ring and the outer ring, the rolling bearing comprising a bearing steel having the above composition, at least one of the inner ring, the outer ring, and the rolling elements being having a full sectional texture hardened by quench-and-temper treatment.

According to the present invention, the limitation of the C, Si, Mn, Cr, Al, N, and Nb contents to respective specific content ranges inhibits the creation of giant carbides at the time of pouring of a steel ingot, permitting the step of soaking at a high temperature for a long period of time to be eliminated. Specifically, in the conventional process, the steps of melting→ingot making→soaking→rolling were necessary, whereas, in the process of the present invention, the steps of melting→ingot making→rolling are necessary, that is, the step of soaking is eliminated, offering the effect of reducing the production cost of steel products. At the same time, the grain size after the quench-and-temper treatment can be reduced, improving mechanical properties such as impact, crushing, and transverse properties. Further, the rolling bearing according to the present invention is advantageous also in that a desired amount of residual austenite (γR) is ensured, offering the effect of providing a long life under severe service environment under contamination with a foreign material and lubrication.

BRIEF DESCRIPTION OF THE DRAWINGS

The invention will be further described in conjunction with the accompanying drawing figures, in which:

FIG. 1 is a heat cycle for soaking of a bearing steel commonly used in the art;

FIG. 2 is a heat cycle for spheroidizing applied to a bearing steel, wherein (a) represents a heat cycle for simplified spheroidizing conducted as a pretreatment in the quench-and-temper treatment of the bearing steel according to the present invention and (b) represents a heat cycle for conventional spheroidizing generally conducted in a bearing steel (SUJ2);

FIG. 3 is a heat cycle for quench-and-temper treatment of the bearing steel according to the present invention;

DISCLOSURE OF THE INVENTION

Figure 4:
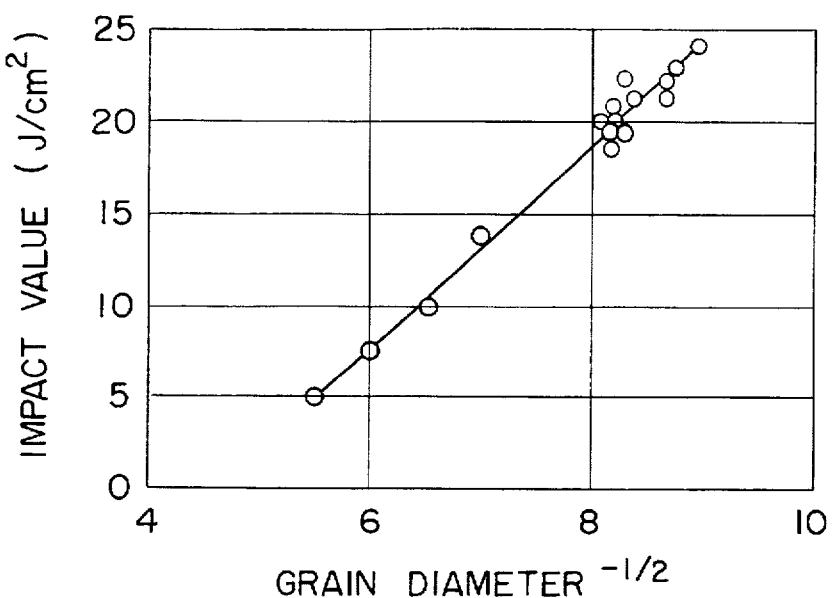
FIG. 4 is a graph showing the relationship between the grain diameter and the impact value for the bearing steel according to the present invention.

The present invention will be described in more detail.

At the outset, the reasons for the limitation of alloy constituents of the bearing steel according to the present invention will be described.

The bearing steel of the present invention is not subject to heat treatment for a long period of time, such as carburizing or carbo-nitriding but is subjected to such heat treatment as conducted in high carbon chromium steel, such as SUJ2 or SUJ3, that is, heating the steel for pretreatment in a reducing atmosphere followed by hardening at 820° to 860° C. and tempering at a low temperature of about 160° to 200° C. This treatment aims to provide a high hardness of not less than 60 in terms of Rockwell C hardness (HRC) and, at the same time, from the viewpoint of avoiding the deteriorating of the life under contamination with a foreign material and lubrication, to offer a texture having carbides dispersed in the matrix. For this purpose, a hypereutectoid composition is necessary, and the C content is limited to not less than 0.7% in consideration of other constituents.

Further, the bearing steel of the present invention aims to attain a low cost through the elimination of the step of soaking. According to an Fe-C binary phase diagram and the Bungardt's phase diagram, theoretical formation limit of an eutectoid in conventional SUJ2 is considered to be C=about 1.68%. Analytical results show that, due to C enrichment at the time of the solidification of a molten steel, the C content reaches about 1.8 times that of the matrix phase (other area than the central segregation area of the steel product). In other words, the upper limit of the content of C in the matrix phase is 0.93% which is a value obtained by dividing the theoretical eutectoid formation limit, 1.68%, by the degree of the segregation, 1.8. That is, when the C content exceeds 0.93%, giant carbide is created at the time of pouring of a steel ingot, necessitating soaking. Therefore, the upper limit of the C content should be 0.93% from the viewpoint of rendering the soaking unnecessary. For the above reason, the lower limit and the upper limit of the C content are 0.7% and 0.93%, respectively.

Si functions as a deoxidizer at the time of steelmaking and, at the same time, improves the hardenability and strengthens matrix martensite. Therefore, it is an element which is useful for elongating the life of the bearing independently of a rolling element and inner and outer rings. The effect of elongating the life of the bearing can be attained when the Si content is about 0.15 to 1.2%. However, working properties, such as machinability, forgeability, and cold workability, are deteriorated. For this reason, the upper limit of the Si content is 0.5% from the viewpoint of ensuring the workability comparable to that of SUJ2 in current use. Regarding the lower limit, when the Si content is less than 0.15%, it is difficult to ensure the hardenability. For the above reason, the lower limit and the upper limit of the Si content was specified respectively to 0.15% and 0.50%.

Mn is added from the viewpoint of regulating the hardenability and, at the same time, of ensuring the desired amount of residual austenite. For example, a bearing for transmission of automobiles is used under contamination with a foreign material and lubrication. It has become apparent that, under such service environment, increasing the amount of the residual austenite ($\gamma_R$) in the bearing material steel is effective in elongating the service life. Therefore, in the bearing steel according to the present invention, the minimum Mn content necessary for ensuring the hardenability and the amount of residual austenite (for example, $\gamma_R$=12 to 17% by volume) equal or superior to that of SUJ2 is specified to 0.50%. Since, however, Mn serves also as a ferrite strengthening element, the cold workability remarkably deteriorates with increasing the Mn content. Therefore, the upper limit of the Mn content is 1.1%. Thus, the Mn content is limited to 0.50 to 1.10%.

Cr is an element which favorably contributes to an improvement in hardenability, an improvement in temper softening resistance, an improvement in abrasion resistance and the like. A Cr content of not less than 0.3% is necessary in order to attain this effect. However, in relation with the C content, Cr is also a carbide former, and when the Cr content exceeds 0.65%, giant carbides are unfavorably created in the course of steelmaking. In order to eliminate this, it is necessary to conduct soaking at a high temperature for a long period of time, leading to increased cost. Accordingly, the upper limit of the Cr content is 0.65%. Thus, the content of Cr in the bearing steel according to the present invention is limited to 0.3 to 0.65%.

The limited Cr/C ratio range is a critical Cr/C ratio range for preventing such an unfavorable phenomenon that, in the molten steel at the time of casting, solute of C and Cr is enriched in the central segregation portion at the time of solidification of the steel product, resulting in the formation of an eutectic carbide. Since the upper limit of the C content of the matrix phase is 0.93% with the upper limit of the Cr content being 0.65%, the upper limit of the Cr/C ratio is specified to Cr/C≦0.65/0.93=0.7, based on these values. On the other hand, the lower limit of the Cr/C ratio is specified to 0.4. The reason for specifying the lower limit of Cr/C to 0.4 is that, as described above, in order to strengthen the matrix of C and Cr to enhance the temper softening resistance and the hardness, thereby elongating the life of the bearing, the minimum value of Cr/C should be 0.4.

N combines with Al or Nb and C to form AlN or Nb(C, N) which is finely precipitated in the steel product to inhibit coarsening of grains. An N content exceeding 0.005% is necessary from the viewpoint of attaining homogeneous dispersion of AlN or Nb(C, N). On the other hand, the addition of N in an amount exceeding 0.02% is usually difficult for reasons of steelmaking operation. Thus, the lower and upper limits of the N content are 0.005% and 0.02%, respectively.

Al combines with N to form AlN which is finely precipitated in the steel product to inhibit coarsening of grains. When the Al content is less than 0.01%, the amount of AlN precipitated is unsatisfactory. On the other hand, when the Al content exceeds 0.1%, large inclusions are formed. For the above reason, the lower and upper limits of the Al content are 0.01% and 0.1%, respectively. The inhibition of coarsening of grains by precipitated grains has been introduced by Gladdman et al., and in order for AlN to maintain the grain size equivalent to that of SUJ2, Al×N≧0.00015 is considered to be necessary. For this reason, the limitation of Al×N≧0.00015 was provided.

Nb combines with C and N to form Nb(C, N) which inhibits coarsening of grains. This effect is attained when the Nb content is 0.02% or more. Therefore, the lower limit of the Nb content is 0.02%. On the other hand, since Nb is an expensive element, the upper limit of the Nb content is 0.1% for reasons of economy.

P and S, impurity elements of the bearing steel, deteriorate the mechanical properties of the steel. Therefore, the lower the P and S contents, the better the results. However, the deterioration of the mechanical properties can be satisfactorily compensated for by the regulation of the grain size. Further, a reduction of the P and S contents to an extreme extent requires an advanced refining system and a satisfactory refining time, causative of an increased cost. For this reason, the upper and lower limits of the P and S contents are specified respectively to levels satisfying JIS G 4805.

Ti and O are nonmetallic inclusion formers harmful to the fatigue of the rolling bearing, and a high-cleanness steel having reduced Ti and O contents and suitable for elongating the life of the bearing are known in the art. However, careful selection of the materials, particular control of the ladle and the like are indispensable to the reduction of these elements, causative of increased cost. Therefore, in the bearing steel according to the present invention, the present inventors have noticed the relationship between the Ti and O contents and the life, and the upper limits of Ti and O contents were specified by the Ti and O contents which minimized the influence on the life, that is, specified respectively to Ti≦40 ppm and O≦15 ppm.

BEST MODE FOR CARRYING OUT THE INVENTION

The present invention will be described with reference to the following examples.

1. Materials under test

Chemical compositions of materials under test are given in Table 1. 100 kg of each of these materials was prepared in a vacuum melting furnace by the melt process and, without soaking, was then cogged into a rod steel having a diameter of 65 mm. Thereafter, for pretreatment, sample Nos. 1 to 16 were subjected to simplified spheroidizing treatment as shown in FIG. 2 (a), while sample No. 17 was subjected to spheroidizing treatment as shown in FIG. 2 (b). The test pieces were then subjected to a machinability test described below. Further, they were roughly worked, subjected to quench-and-temper treatment as shown in FIG. 3, finished, and subjected to various tests other than the machinability test.

In Table 1, sample Nos. 1 to 3 are bearing steels of the present invention, while sample Nos. 4 to 16 were comparative steels. Sample No. 17 is a standard steel and SUJ2. This sample was soaked at 1200° C. for 15 hr. For all the samples, regarding impurities, the P and S contents were each not more than 0.025%, the Ti content was not more than 40 ppm, and the O content was not more than 15 ppm.

2. Various tests

All the samples of sample Nos. 1 to 17 were subjected to various tests, that is, the measurement of quench-and-temper hardness, life test under contamination with foreign material and lubrication, machinability test, confirmation of giant particle, impact test, crushing test, and transverse test. The quench-and-temper conditions were as shown in a heat cycle of FIG. 3.

(1) Life test

The life test was performed using a thrust type life tester.
Pmax: 500 kgf/mm$^2$
Number of rotations: 1000 rpm
Lubricant: No. 68 turbine oil
Foreign material incorporated:
Hardness: HV540
Particle diameter: 74 to 147 μm
Amount of foreign material: 300 ppm For each material under test, the number of tests, n, were 8 to 10, and the life was evaluated in terms of L10 life. The results are tabulated in Table 2.

(2) Machinability test

For sample Nos. 1 to 16, a test piece after simplified spheroidizing was used for the machinability test. For sample No. 17 as a standard steel, a test piece after spheroidizing was used.
Cutting conditions:
Cutting speed: 200 m/min.
Depth of cut: 1 mm
Feed rate: 0.25 mm/rev.

The materials under test were cut under the above test conditions, and the machinability was evaluated in terms of the time taken for the abrasion loss of the relief of the cutting tool to reach 0.2 mm. The results are tabulated in Table 2.

(3) Impact test

A 10RC notch test piece was used as an impact test piece. The results are tabulated in Table 2.

(4) Crushing test

A ring test piece having an outer diameter of 60 mm, an inner diameter of 40 mm, and a width of 15 mm was used as the test piece for the crushing test.

(5) Transverse test

A rod test piece having a diameter of 10 mm and a length of 60 mm was used as a test piece for the transverse test.

The results of various tests show that sample Nos. 1 to 3 as the steel of the present invention were free from the creation of giant carbides at the time of pouring of a steel ingot and were equal or superior to sample No. 17 as the standard steel in all of quench-and-temper hardness, life, and impact value. Regarding the machinability, the steels of the present invention, although they were subjected to simplified spheroidizing treatment which requires shorter treatment time and lower temperature than the spheroidizing in the case of sample No. 17, had machinability equal or superior to sample No. 17.

By contrast, the results of each comparative steel were as follows.

For sample No. 4 having a C content exceeding the upper limit of the C content specified in the present invention, giant carbides were created at the time of pouring of a steel ingot, necessitating soaking. The test results were for a test piece which had not been soaked.

For sample No. 5 having a C content below the lower limit of the C content specified in the present invention, no carbide finely dispersed in the texture after the quench-and-temper treatment was present, shortening the life.

For sample No. 6 having an Si content exceeding the upper limit of the Si content specified in the present invention, the machinability was remarkably deteriorated.

For sample No. 7 having an Si content below the lower limit of the Si content specified in the present invention, the hardenability was unsatisfactory resulting in increased variation in quench-and-temper hardness and shortened life.

For sample No. 8 having an Mn content exceeding the Mn content specified in the present invention, the machinability was remarkably deteriorated.

For sample No. 9 having an Mn content below the Mn content specified in the present invention, the life was deteriorated.

For sample No. 10 having a Cr content and a Cr/C value exceeding the respective upper limits of the Cr content and the Cr/C value specified in the present invention, giant carbides were created resulting in deteriorated life and machinability.

For sample No. 11 having a Cr content and a Cr/C value below the respective lower limits of the Cr content and the Cr/C value specified in the present invention, the life value was deteriorated.

For sample No. 12 having a Cr/C value exceeding the upper limit of the Cr/C value, both the life and the machinability were deteriorated as with sample No. 10.

For sample No. 13 having a Cr/C value below the lower limit of the Cr/C value specified in the present invention, the life value was deteriorated.

For sample Nos. 14 to 16 having a poor balance between Al and N, the diameter of former austenite grains was increased. Specifically, the grain size after the quench-andtemper treatment (diameter of former austenite grains) was increased resulting in deteriorated impact value, crushing load, and transverse load.

Figure 5:
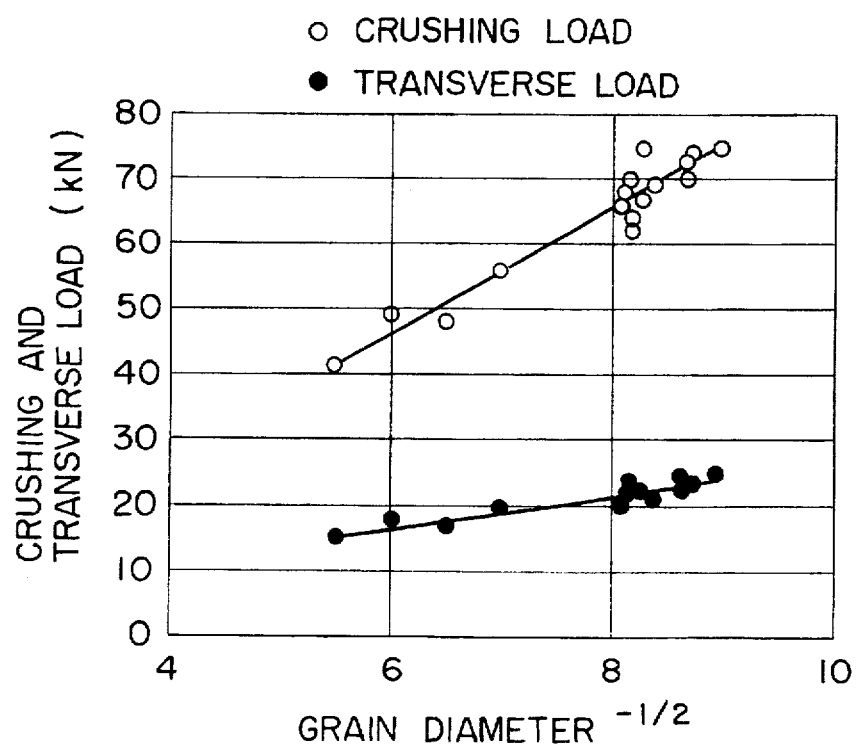
FIG. 5 is a graph showing the grain diameter dependency of the mechanical properties of the bearing steel according to the present invention.

The relationship between the above properties and the grain size (former austenite grain diameter) is shown in FIGS. 4 and 5. All the impact value, crushing load, and transverse load were proportional to the minus one-half power of the grain diameter.

As described above, in the present invention for omitting the soaking treatment, a steel comprising C: 0.7 to 0.93% by weight, Cr: 0.3 to 0.65% by weight with Cr/C: 0.4 to 0.7 is suitable. Si: 0.15 to 0.5% by weight is necessary from the viewpoint of improving the workability before the heat treatment, and Mn: 0.5 to 1.10% by weight is necessary from the viewpoint of ensuring $\gamma_R$: 12 to 17% by volume which brings the life of the bearing under inclusion of foreign material and lubricant to a long life. Further, the grain diameter, that is, grain diameter of former austenite, should be brought to not more than 15 μm in order to ensure the mechanical strength.

TABLE 1

Chemical compositions of materials under test

| Classi-fication | Sample No. | Constituents (wt %) | | | | | | | | |
|---|---|---|---|---|---|---|---|---|---|---|
| | | C | Si | Mn | Cr | Al | Nb | N | Cr/C | Al × N |
| Steel of inv. | 1 | 0.93 | 0.49 | 1.10 | 0.63 | 0.023 | — | 0.008 | 0.68 | 0.00018 |
| | 2 | 0.71 | 0.17 | 0.50 | 0.31 | 0.007 | 0.03 | 0.005 | 0.44 | 0.00004 |
| | 3 | 0.82 | 0.33 | 0.84 | 0.45 | 0.050 | 0.04 | 0.005 | 0.55 | 0.00025 |
| Comp. steel | 4 | 0.96 | 0.33 | 0.85 | 0.43 | 0.018 | — | 0.010 | 0.45 | 0.00018 |
| | 5 | 0.67 | 0.34 | 0.85 | 0.44 | 0.020 | — | 0.008 | 0.66 | 0.00016 |
| | 6 | 0.83 | 0.55 | 0.84 | 0.44 | 0.025 | — | 0.008 | 0.53 | 0.00020 |
| | 7 | 0.82 | 0.13 | 0.86 | 0.43 | 0.020 | — | 0.012 | 0.52 | 0.00024 |
| | 8 | 0.82 | 0.35 | 1.14 | 0.44 | 0.018 | — | 0.010 | 0.54 | 0.00018 |
| | 9 | 0.84 | 0.34 | 0.45 | 0.42 | 0.025 | — | 0.008 | 0.50 | 0.00020 |
| | 10 | 0.81 | 0.34 | 0.83 | 0.68 | 0.015 | — | 0.006 | 0.84 | 0.00009 |
| | 11 | 0.83 | 0.34 | 0.84 | 0.26 | 0.015 | — | 0.010 | 0.31 | 0.00015 |
| | 12 | 0.83 | 0.35 | 0.84 | 0.61 | 0.020 | — | 0.008 | 0.73 | 0.00016 |
| | 13 | 0.86 | 0.34 | 0.84 | 0.32 | 0.018 | — | 0.009 | 0.37 | 0.00016 |
| | 14 | 0.71 | 0.34 | 0.84 | 0.44 | 0.009 | — | 0.020 | 0.62 | 0.00018 |
| | 15 | 0.83 | 0.35 | 0.84 | 0.44 | 0.050 | — | 0.003 | 0.53 | 0.00015 |
| | 16 | 0.93 | 0.34 | 0.84 | 0.43 | 0.018 | — | 0.005 | 0.46 | 0.00009 |
| Standard steel | 17 | 1.02 | 0.25 | 0.34 | 1.45 | 0.015 | — | 0.005 | 1.42 | 0.00008 |

TABLE 2

Results of various tests

| Classi-fication | Sample No. | Quench-and-temper hardness (HRC) | Life of bearing under contamination with foreign material and lubrication (×10⁸ cycle) | Time taken for abrasion of relief to reach 0.2 mm (min) | Giant carbides at the time of pouring | Impact value (J/cm²) | Crushing load (kN) | Transverse load (kN) | Grain diameter (mm) |
|---|---|---|---|---|---|---|---|---|---|
| Steel of inv. | 1 | 61.7 | 3.7 | 11 | Absent | 22.5 | 67 | 22 | 0.015 |
| | 2 | 60.6 | 3.5 | 14 | Absent | 21.3 | 70 | 24 | 0.013 |
| | 3 | 61.6 | 4.2 | 15 | Absent | 24.2 | 75 | 25 | 0.012 |
| Comp. steel | 4 | 62.0 | 2.5 | 10 | Present | 20.0 | 66 | 20 | 0.015 |
| | 5 | 59.5 | 0.8 | 16 | Absent | 18.8 | 68 | 21 | 0.015 |
| | 6 | 60.9 | 3.6 | 3 | Absent | 20.0 | 64 | 21 | 0.015 |
| | 7 | 60.3 | 1.1 | 15 | Absent | 19.5 | 75 | 22 | 0.015 |
| | 8 | 60.9 | 3.4 | 4 | Absent | 21.3 | 69 | 21 | 0.014 |
| | 9 | 60.1 | 1.0 | 13 | Absent | 20.8 | 62 | 23 | 0.015 |
| | 10 | 61.0 | 2.0 | 6 | Present | 7.5 | 49 | 18 | 0.028 |
| | 11 | 60.8 | 1.8 | 9 | Absent | 23.0 | 74 | 23 | 0.013 |
| | 12 | 61.5 | 2.1 | 7 | Absent | 18.5 | 64 | 20 | 0.015 |
| | 13 | 60.9 | 2.2 | 10 | Absent | 19.5 | 70 | 21 | 0.015 |
| | 14 | 60.8 | 1.9 | 12 | Absent | 5.0 | 41 | 15 | 0.033 |
| | 15 | 61.5 | 2.2 | 11 | Absent | 10.0 | 48 | 17 | 0.024 |
| | 16 | 60.9 | 2.1 | 10 | Absent | 13.8 | 56 | 20 | 0.020 |
| Standard steel | 17 | 62.5 | 3.4 | 10 | Present | 22.3 | 73 | 23 | 0.013 |

What is claimed is:

1. A bearing steel comprising by weight C: 0.70 to 0.93%, Si: 0.15 to 0.50%, Mn: 0.50 to 1.10%, Cr: 0.30 to 0.65%, and N: 0.005 to 0.02% with 0.4≦Cr/C≦0.7 and the balance consisting of Fe and unavoidable impurities, said steel further comprising at least one of
(1) Al: 0.01 to 0.1% with Al×N≧0.00015, and
(2) Nb: 0.02 to 0.1%.

2. A rolling bearing comprising an inner ring, an outer ring, and a plurality of rolling elements rolled between the inner ring and the outer ring, at least one of the inner ring, the outer ring, and the rolling element being comprised of a bearing steel comprising by weight C: 0.70 to 0.93%, Si: 0.15 to 0.50%, Mn: 0.50 to 1.10%, Cr: 0.30 to 0.65%, and N: 0.005 to 0.02% with 0.4≦Cr/C≦0.7 and the balance consisting of Fe and unavoidable impurities, said steel further comprising at least one of
(1) Al: 0.01 to 0.1% with Al×N≧0.00015, and
(2) Nb: 0.02 to 0.1%,
at least one of the inner ring, the outer ring, and the rolling element having a full sectional texture hardened by quench-and-temper treatment.

3. The rolling bearing according to claim 2, wherein the quench-and-temper treatment involves quenching at 820° to 860° C. and tempering at 160° to 200° C.

4. The rolling bearing according to claim 2, wherein said bearing steel further has a grain diameter of former austenite in the full sectional texture of not more than 15 µm.

5. The rolling bearing according to claim 2, wherein the rolling element has a full sectional texture that is a finely spheroidized full section texture prepared by subjecting the rolling element to a spheroidizing treatment wherein the rolling element is held at 740° to 780° C. for 2 hours or less, slowly cooled to 650° C., and cooled to room temperature, before the quench-and-temper treatment.

6. The bearing steel of claim 1, comprising by weight C: 0.71 to 0.93%; Si: 0.17 to 0.49%; Mn: 0.50 to 1.10%; Cr: 0.31 to 0.63%; Al: 0.01 to 0.23%; Nb: 0.02 to 0.04%; N: 0.005 to 0.008% and having a Cr/C ratio of 0.44 to 0.68 and a product Al×N of 0.00004 to 0.00025.

7. The bearing steel of claim 1, comprising by weight C: 0.82%; Si: 0.33%; Mn: 0.84%; Cr: 0.45%; Al: 0.050%; Nb: 0.04%; N: 0.005%.

8. The bearing steel of claim 1, comprising by weight C: 0.71% ; Si: 0.17%; Mn: 0.50%; Cr: 0.31%; Al: 0.007%; Nb: 0.03%; N: 0.005%.

9. A rolling bearing comprising an inner ring, an outer ring, and a plurality of rolling elements rolled between the inner ring and the outer ring, wherein at least one of the inner ring, the outer ring and the plurality of rolling elements is comprised of the bearing steel of claim 6 and wherein at least one of the inner ring, the outer ring and the plurality of rolling elements has a full sectional texture hardened by quench-and-temper treatment.

10. A rolling bearing comprising an inner ring, an outer ring, and a plurality of rolling elements rolled between the inner ring and the outer ring, wherein at least one of the inner ring, the outer ring and the plurality of rolling elements is comprised of the bearing steel of claim 7 and wherein at least one of the inner ring, the outer ring and the plurality of rolling elements has a full sectional texture hardened by quench-and-temper treatment.

11. A rolling bearing comprising an inner ring, an outer ring, and a plurality of rolling elements rolled between the inner ring and the outer ring, wherein at least one of the inner ring, the outer ring and the plurality of rolling elements is comprised of the bearing steel of claim 8 and wherein at least one of the inner ring, the outer ring and the plurality of rolling elements has a full sectional texture hardened by quench-and-temper treatment.

12. The rolling bearing according to claim 9, wherein the quench-and-temper treatment involves quenching at 820° to 860° C. and tempering at 160° to 200° C.

13. The rolling bearing according to claim 10, wherein the quench-and-temper treatment involves quenching at 820° to 860° C. and tempering at 160° to 200° C.

14. The rolling bearing according to claim 11, wherein the quench-and-temper treatment involves quenching at 820° to 860° C. and tempering at 160° to 200° C.

15. The rolling bearing according to claim 9, wherein said bearing steel further has a grain diameter of former austenite in the full sectional texture of not more than 15 µm.

16. The rolling bearing according to claim 10, wherein said bearing steel further has a grain diameter of former austenite in the full sectional texture of not more than 15 µm.

17. The rolling bearing according to claim 11, wherein said bearing steel further has a grain diameter of former austenite in the full sectional texture of not more than 15 µm.

18. The rolling bearing according to claim 9, wherein the rolling element has a full sectional texture that is a finely spheroidized full sectional texture prepared by subjecting the rolling element to a spheroidizing treatment, wherein the rolling element is held at 740° to 780° C. for 2 hours or less, slowly cooled to 650° C., and cooled to room temperature before the quench-and-temper treatment.

19. The rolling bearing according to claim 10, wherein the rolling element has a full sectional texture that is a finely spheroidized full sectional texture prepared by subjecting the rolling element to a spheroidizing treatment, wherein the rolling element is held at 740° to 780° C. for 2 hours or less, slowly cooled to 650° C., and cooled to room temperature before the quench-and-temper treatment.

20. The rolling bearing according to claim 11, wherein the rolling element has a full sectional texture that is a finely spheroidized full sectional texture prepared by subjecting the rolling element to a spheroidizing treatment, wherein the rolling element is held at 740° to 780° C. for 2 hours or less, slowly cooled to 650° C., and cooled to room temperature before the quench-and-temper treatment.

* * * * *